Figure 1:
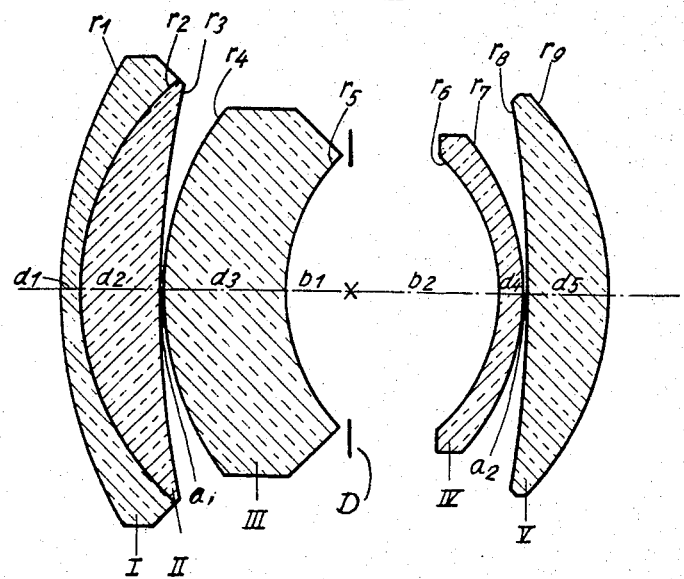

Nov. 29, 1955

G. LANGE 2,724,994

PHOTOGRAPHIC OBJECTIVE COMPRISING FOUR
MENISCUS SHAPED AIR SPACED COMPONENTS

Filed March 10, 1954

United States Patent Office 2,724,994
Patented Nov. 29, 1955

2,724,994
PHOTOGRAPHIC OBJECTIVE COMPRISING FOUR MENISCUS SHAPED AIR SPACED COMPONENTS

Günther Lange, Konigsbronn, Germany, assignor to Carl Zeiss, Heidenheim (Brenz), Germany Application March 10, 1954, Serial No. 415,221

Claims priority, application Germany March 17, 1953

3 Claims. (Cl. 88—57)

The present invention concerns photographic objectives, especially such with a relative aperture of 1:4 and above, which consist of four meniscus-shaped components separated from one another by air spaces and turning all their concave surfaces bordering on air towards the diaphragm, namely of a collective front component, two dispersive components, which lie at both sides of the diaphragm and turn the concave side to this, and a collective rear component, whereby the component lying behind the diaphragm is a simple uncemented lens and shows a mid-thickness, which at most is one half and at least is one tenth of the mid-thickness of the component lying in front of the diaphragm. In known objectives of this kind, the chromatic correction is effected to a substantial part thereby, that the dispersive component lying immediately before the diaphragm is made up of two lenses cemented together with one another of opposite refractive power and of different dispersion, and whereby the front, collective lens of this cemented component consists of a glass of smaller dispersion and the rear, dispersive lens of this cemented component of a glass of higher dispersion. Thereby the common cemented surface generally turns the convex side towards the diaphragm.

With the unsymmetrical kind of construction of these objectives, the mentioned manner of effecting the chromatic correction has as a consequence that the chromatic transverse aberration with larger image angles has a strong tendency towards negative values. Through this one is forced to select the chromatic transverse aberration for small image angles noticeably positive in order then with greater image angles not to be obliged to accord any altogether too great negative chromatic transverse aberrations. This tendency towards negative values for the chromatic transverse aberration, with larger image angles, has its basis on the one hand in the unsymmetrical manner of construction, on the other hand however therein, that the center of curvature of the chromatically effective cemented surface and the location of the diaphragm are far separated from one another, in general even lie on different sides of this cemented surface.

Now in accordance with the present invention the chromatic correction of objectives of the kind described at the outset is undertaken to a considerable part already in the front component, namely in that the front component is composed of two lens elements of opposite refractive power cemented to one another, whereby the cemented surface of this component turns its concave side towards the diaphragm, the radius of this cemented surface is smaller than that of each of the two outer radii of said front component but lies within the limits of 0.2 to 0.4 of the focal length f of the objective, and that the glass of the collective element of this front component shows a lesser dispersion than the glass of the dispersive element of this front component, whereby the difference in Abbe numbers of both said elements is equal or greater than 10. To diminish the spherical overcorrection of the oblique pencils and to obtain an execution form of an objective in accordance with the invention advantageous in respect to coma and astigmatism of the oblique pencils it is suitable to fulfill further the following conditions:

$$0.25 \cdot f < D_s < 0.65 \cdot f$$
$$1.25 \cdot \bar{r}_s < D_s < 1.50 \cdot \bar{r}_s$$
$$0.20 \cdot f < \bar{r}_s < 0.50 \cdot f$$
$$0.15 \cdot f < D_z < 0.40 \cdot f$$
$$0.90 \cdot \bar{r}_z < D_z < 1.40 \cdot \bar{r}_z$$
$$0.15 \cdot f < \bar{r}_z < 0.25 \cdot f$$
$$0.60 \cdot f < r_1 + |r_9| < 1.00 \cdot f$$
$$0.45 \cdot f < L < 0.60 \cdot f$$

wherein:

$D_s$ is the vertex distance between the collective surfaces of the dispersive components, and $\bar{r}_s$ the arithmetic mean of the absolute values of the radii of these surfaces;

$D_z$ the vertex distance between the two concave surfaces surrounding the diaphragm, and $\bar{r}_z$ the arithmetic mean of the absolute values of the radii of these surfaces;

L the total length of the objective;

$r_1$ the radius of the first refractive surface of the objective;

$|r_9|$ the absolute value of the radius of the last refractive surface of the objective.

An objective form which permits especially good flattening of the image field is obtained if one selects the mid-thickness of the meniscus-shaped dispersive lens following the diaphragm smaller than 5% of the focal length of the objective.

The Figures 1 and 2 of the accompanying illustrations represent two objectives in which the characteristics of the present invention are fulfilled and are constructed in accordance with the numerical values specified in the following tables. Through the application of the measures in accordance with the invention, objectives result with good chromatic correction, which with a relative aperture of 1:2.8 show a Petzval sum which is smaller than the amount $0.2 \cdot 1/f$, whereby f signifies the objective focal length. In Example I in accordance with Fig. 1 this value amounts to $0.1167 \cdot 1/f$, whereas in Example II in accordance with Fig. 2 a value of $0.1244 \cdot 1/f$ results.

In the figures and in the examples there are designated with Roman letters the lenses, with r the radii, with D the diaphragm, with $a_1$, $a_2$, $b_1$, $b_2$ the distances between the individual components, with V the Abbe numbers, with $n_d$ the refractive index of the glasses. The values are referred to a focal length f=100 units.

Example I (Fig. 1)

| Lenses | Radii | Thicknesses and distances | $n_D$ | V |
|---|---|---|---|---|
| I | $r_1 = +\ 44.284$ | $d_1 = 1.872$ | 1.62536 | 35.6 |
| II | $r_2 = +\ 26.761$ | $d_2 = 7.863$ | 1.62041 | 60.3 |
|  | $r_3 = +\ 96.327$ | $a_1 = 0.125$ |  |  |
| III | $r_4 = +\ 29.174$ | $d_3 = 11.682$ | 1.76182 | 26.5 |
|  | $r_5 = +\ 18.945$ | $b_1 = 6.270$ |  |  |
|  |  | $b_2 = 14.329$ |  |  |
| IV | $r_6 = -\ 17.885$ | $d_4 = 2.621$ | 1.76182 | 26.5 |
|  | $r_7 = -\ 23.509$ | $a_2 = 0.125$ |  |  |
| V | $r_8 = -112.85$ | $d_5 = 7.788$ | 1.62041 | 60.3 |
|  | $r_9 = -\ 27.941$ |  |  |  |

Figure 2:
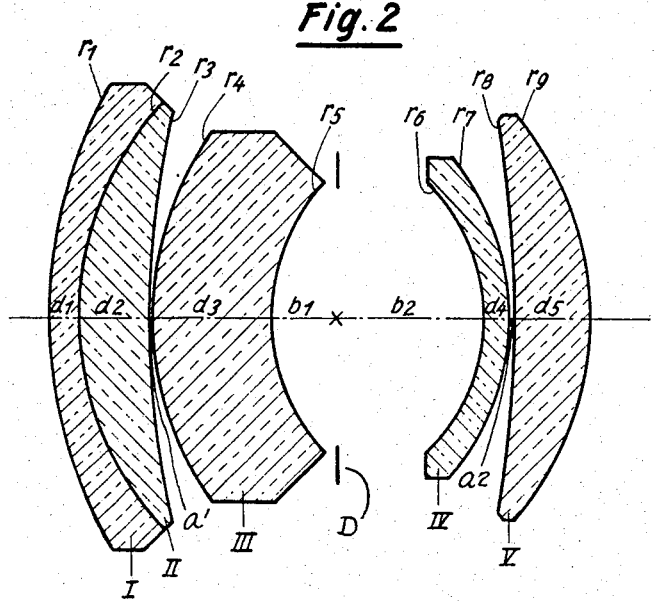

Example II (Fig. 2)

| Lenses | Radii | Thicknesses and distances | $n_D$ | V |
|---|---|---|---|---|
| I | $r_1 = +44.341$ | $d_1 = 2.624$ | 1.69895 | 30.1 |
| II | $r_2 = +29.212$ | $d_2 = 6.998$ | 1.69347 | 53.5 |
|  | $r_3 = +84.733$ | $a_1 = 0.125$ |  |  |
| III | $r_4 = +29.635$ | $d_3 = 11.597$ | 1.69895 | 30.1 |
|  | $r_5 = +18.969$ | $b_1 = 6.270$ |  |  |
|  |  | $b_2 = 14.225$ |  |  |
| IV | $r_6 = -17.908$ | $d_4 = 2.437$ | 1.76182 | 26.5 |
|  | $r_7 = -23.539$ | $a_2 = 0.250$ |  |  |
| V | $r_8 = -111.38$ | $d_5 = 7.536$ | 1.62041 | 60.3 |
|  | $r_9 = -27.577$ |  |  |  |

I claim:

1. Photographic objective consisting of four meniscus-shaped components separated from each other by air spaces, turning all their concaves bordering on air towards the diaphragm, namely of a collective front component, two dispersive components surrounding the diaphragm, and a collective rear component, the component lying immediately behind the diaphragm being a single uncemented lens and having a mid-thickness of at most one half and at least one tenth of the mid-thickness of the component lying immediately before the diaphragm, the front component consisting of two lenses of opposite refractive power cemented together, the cemented surface turning its concave side towards the diaphragm and its radius being smaller than that of each of its two outer radii but lying within the limits of 0.2 to 0.4 of the focal length f of the objective, the glass of the collective element of said front component having a lesser dispersion than the glass of the dispersive element of this front component, the difference in Abbe numbers (V) of both said elements being equal or greater than 10, and the following conditions being fulfilled:

$$0.25 \cdot f < D_s < 0.65 \cdot f$$
$$1.25 \cdot \overline{r_s} < D_s < 1.50 \cdot \overline{r_s}$$
$$0.20 \cdot f < \overline{r_s} < 0.50 \cdot f$$
$$0.15 \cdot f < D_z < 0.40 \cdot f$$
$$0.90 \cdot \overline{r_z} < D_z < 1.40 \cdot \overline{r_z}$$
$$0.15 \cdot f < \overline{r_z} < 0.25 \cdot f$$
$$0.60 \cdot f < |r_1| + |r_9| < 1.00 \cdot f$$
$$0.45 \cdot f < L < 0.60 \cdot f$$

wherein:

$D_s$ is the vertex distance between the collective surfaces of the dispersive components, and $\overline{r_s}$ the arithmetic mean of the absolute values of the radii of these surfaces;

$D_z$ the vertex distance between the two concave surfaces surrounding the diaphragm, and $\overline{r_z}$ the arithmetic mean of the absolute values of the radii of these surfaces;

L the total length of the objective;

$r_1$ the radius of the first refractive surface of the objective;

$|r_9|$ the absolute value of the radius of the last refractive surface of the objective.

2. Photographic objective according to claim 1, the refractive power ($\Delta n/r$) differing at most $\pm 0.5 \cdot f$ and the thicknesses and air distances differing at most $\pm 0.05 \cdot f$ from the values of the following example.

| Lenses | Radii | Thicknesses and Distances | $n_d$ | V | ($\Delta n/r$) |
|---|---|---|---|---|---|
| $L_I$ | $r_1 = +0.44284 \cdot f$ | $d_1 = 0.01872 \cdot f$ | 1.62536 | 35.6 | $+1.412158 \cdot 1/f$ |
| $L_{II}$ | $r_2 = +0.26761 \cdot f$ | $d_2 = 0.07863 \cdot f$ | 1.62041 | 60.3 | $-0.018497 \cdot 1/f$ |
|  | $r_3 = +0.96327 \cdot f$ | $a_1 = 0.00125 \cdot f$ |  |  | $-0.644067 \cdot 1/f$ |
| $L_{III}$ | $r_4 = +0.29174 \cdot f$ | $d_3 = 0.11682 \cdot f$ | 1.76182 | 26.5 | $+2.611298 \cdot 1/f$ |
|  | $r_5 = +0.18945 \cdot f$ | $b_1 = 0.06270 \cdot f$ |  |  | $-4.021219 \cdot 1/f$ |
|  |  | $b_2 = 0.14329 \cdot f$ |  |  |  |
| $L_{IV}$ | $r_6 = -0.17885 \cdot f$ | $d_4 = 0.02621 \cdot f$ | 1.76182 | 26.5 | $-4.259547 \cdot 1/f$ |
|  | $r_7 = -0.23509 \cdot f$ | $a_2 = 0.00125 \cdot f$ |  |  | $+3.240546 \cdot f/1$ |
| $L_V$ | $r_8 = -1.1258 \cdot f$ | $d_5 = 0.07788 \cdot f$ | 1.62041 | 60.3 | $-0.549765 \cdot 1/f$ |
|  | $r_9 = -0.27941 \cdot f$ |  |  |  | $+2.220429 \cdot 1/f$ | wherein:

$L_I$ to $L_V$ are the respective numbers of the individual lenses, $r_1$ to $r_9$ the respective radii of the refracting surfaces, $d_1$ to $d_5$ the respective thicknesses of the components, $a_1$ the air distance between the first and the second component, $a_2$ the air distance between the third and the fourth component, $b_1$ the air distance between the second component and the diaphragm, $b_2$ the air distance between the third component and the diaphragm, $n_d$ the refractive indices of the glasses, V the Abbe numbers, $\Delta n/r$ the refractive power of the individual lens surfaces, the values being referred to a focal length f=100 units of the whole objective.

3. Photographic objective according to claim 1, the refractive power ($\Delta n/r$) differing at most $\pm 0.5 \cdot f$ and the thicknesses and air distances differing at most ±0.05·f from the values of the following example:

| Lenses | Radii | Thicknesses and Distances | $n_d$ | V | $(\Delta n/r)$ |
|---|---|---|---|---|---|
| $L_I$ | $r_1=+0.44341 \cdot f$ | $d_1=0.02624 \cdot f$ | 1.69895 | 30.1 | $+1.576306 \cdot 1/f$ |
|  | $r_2=+0.29212 \cdot f$ |  |  |  | $-0.018759 \cdot 1/f$ |
| $L_{II}$ |  | $d_2=0.06998 \cdot f$ | 1.69347 | 53.5 |  |
|  | $r_3=+0.84733 \cdot f$ |  |  |  | $-0.818418 \cdot 1/f$ |
|  |  | $a_1=0.00125 \cdot f$ |  |  |  |
|  | $r_4=+0.29635 \cdot f$ |  |  |  | $+2.358529 \cdot 1/f$ |
| $L_{III}$ |  | $d_3=0.11597 \cdot f$ | 1.69895 | 30.1 |  |
|  | $r_5=+0.18969 \cdot f$ |  |  |  | $-3.684696 \cdot 1/f$ |
|  |  | $b_1=0.06270 \cdot f$ |  |  |  |
|  |  | $b_2=0.14225 \cdot f$ |  |  |  |
|  | $r_6=-0.17908 \cdot f$ |  |  |  | $-4.254077 \cdot 1/f$ |
| $L_{IV}$ |  | $d_4=0.02437 \cdot f$ | 1.76182 | 26.5 |  |
|  | $r_7=-0.23539 \cdot f$ |  |  |  | $+3.236416 \cdot 1/f$ |
|  |  | $a_2=0.00250 \cdot f$ |  |  |  |
|  | $r_8=-1.1138 \cdot f$ |  |  |  | $-0.557021 \cdot 1/f$ |
| $L_V$ |  | $d_5=0.07536 \cdot f$ | 1.62041 | 60.3 |  |
|  | $r_9=-0.27577 \cdot f$ |  |  |  | $+2.249737 \cdot 1/f$ | wherein:

$L_I$ to $L_V$ are the respective numbers of the individual lenses,
$r_1$ to $r_9$ the respective radii of the refracting surfaces,
$d_1$ to $d_5$ the respective thicknesses of the components,
$a_1$ the air distance between the first and the second component,
$a_2$ the air distance between the third and the fourth component,
$b_1$ the air distance between the second component and the diaphragm,
$b_2$ the air distance between the third component and the diaphragm,
$n_d$ the refractive indices of the glasses,
V the Abbe numbers,
$\Delta n/r$ the refractive power of the individual lens surfaces, the values being referred to a focal length f=100 units of the whole objective.

References Cited in the file of this patent

UNITED STATES PATENTS

| 2,171,640 | Berek | Sept. 5, 1939 |
| 2,670,659 | Tronnier | Mar. 2, 1954 |
| 2,672,788 | Brendel | Mar. 23, 1954 |

FOREIGN PATENTS

| 620,635 | Great Britain | Mar. 28, 1949 |